APPARATUS FOR OPENING AND CLOSING AN ELECTRICAL CIRCUIT

Filed April 20, 1956 2 Sheets-Sheet 1

INVENTORS
BERNARD RASOF
EARL D. JACOBS
BY
Elliott & Pastoriza
ATTORNEYS

April 7, 1959 B. RASOF ET AL 2,881,359

APPARATUS FOR OPENING AND CLOSING AN ELECTRICAL CIRCUIT

Filed April 20, 1956 2 Sheets-Sheet 2

INVENTORS
BERNARD RASOF
EARL D. JACOBS
BY Elliott & Pastoriza
ATTORNEYS

United States Patent Office 2,881,359

Patented Apr. 7, 1959

2,881,359

APPARATUS FOR OPENING AND CLOSING AN ELECTRICAL CIRCUIT

Bernard Rasof, Pacific Palisades, and Earl D. Jacobs, Pasadena, Calif.

Application April 20, 1956, Serial No. 579,584

9 Claims. (Cl. 315—160)

This invention relates generally to an apparatus for opening and closing an electrical circuit, and more particularly to a novel electrical relay switching system.

A primary object of the present invention is to provide a novel switching system in which a circuit carrying a relatively large electrical current, of the order of several amperes for example, may be opened or closed in response to a relatively small current of the order of microamperes.

Another object is to provide a system of the above type in which the counterpart of conventional relay contacts therein are not subject to burning, arcing, pitting, corrosion and the like.

Still another general object of the invention is to provide an electrical switching relay, having an adjustable time delay.

A particular object is to provide an off-on switch periodically and automatically de-energizing and energizing an electrical network.

These and other objects of this invention are attained by taking advantage of certain electrical properties associated with the surface tension of a conducting liquid. In accordance with the invention, a conducting nonionizing liquid, such as mercury, is positioned in a container including a first electrode in continuous electrical contact with the mercury. An electrolytic solution, such as sulphuric acid, is confined in a position in the container to contact one portion of the conducting liquid whereby the surface tension of the conducting liquid at the interface thereof with the electrolytic solution is altered. This change in the surface tension characteristics is a result of certain electrical effects established by chemical action between the electrolytic solution and the conducting liquid.

The change in surface tension is such as to establish another portion of the conducting liquid in another part of the container at a level different from its normal level in the absence of the electrolytic solution. A second electrode is positioned with respect to this given level such that it is out of contact with the conducting liquid when the reaction of the electrolytic solution with the first mentioned portion of the conducting liquid has reached a steady state or quiescent condition. If now an electrical potential is applied across the interface of the electrolytic solution and conducting liquid and is of the proper polarity, the surface tension is returned to its normal characteristics by a neutralization of the electrical effects. The further change in surface tension back to its normal condition causes the level of the second portion of the conducting liquid to contact the second referred to electrode whereby a conducting circuit is established between the first and second electrodes. This conducting circuit is capable of carrying a relatively large current, whereas the power requirements for generating the applied potential across the inner face are relatively very small.

A better understanding of the invention as well as preferred embodiments thereof will be had by referring to the accompanying drawings in which.

Figure 1:
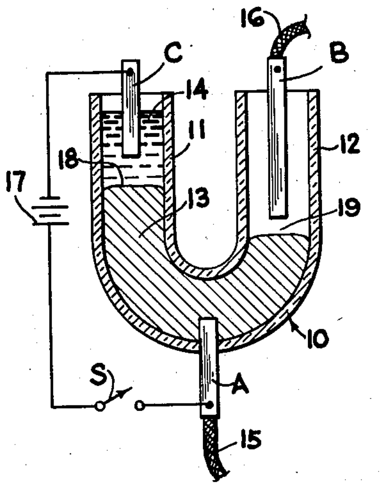
Figure 1 is a schematic diagram illustrating one embodiment of the invention wherein a conducting circuit is in its open condition.

Referring first to Figure 1, there is shown a U-tube 10 comprising arms 11 and 12. Within the U-tube there is positioned a conducting liquid 13, preferably mercury. In one arm 11 of the U-tube there is placed in contact with a first portion of the mercury 13, an electrolytic solution 14, for example, sulphuric acid.

A pair of high current carrying electrodes A and B respectively are associated with the U-tube 10. As shown in Figure 1, the first electrode A passes up through the bottom of the U-tube to remain in continuous electrically conductive contact with the conductive liquid 13. The second electrode B, on the other hand, is positioned in spaced relationship with respect to the electrode A such that it is out of contact with a second portion of the conducting liquid within the arm 12. Power cables 15 and 16 may be connected to the electrodes A and B as shown to pass to any suitable electrical network which is to be operated by the relay. A potential source illustrated as a battery 17 is arranged to be applied across the interface 18 between the electrolytic solution 14 and conducting liquid 13. In the absence of the applied potential, the interaction between the electrolytic solution and conducting liquid is such that the surface tension of the conducting liquid is altered from normal. The alteration is such that the surface tension between the conducting liquid 13 and walls of the U-tube arm 11 is increased so that the second portion of the liquid 13 in the arm 12 is drawn out of contact with the electrode B as indicated by the space 19.

Figure 2:
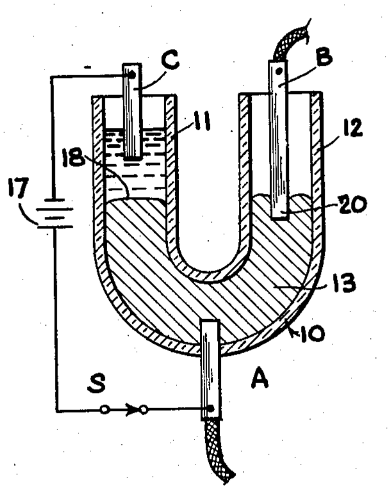
Figure 2 is a view of the apparatus of Figure 1, in which the conducting circuit has been closed.

Upon closing of the switch S as indicated in Figure 2, a small potential is applied across the interface 18 by the battery 17. The polarity of this potential is such that the electrical phenomenon taking place at the interface is neutralized whereby the surface tension is altered to its normal state to bring the levels in the two arms of the U-tube even with each other. The reaction causes the second portion of the conducting liquid 13 in the arm 12 to rise into engagement with the electrode B as indicated at 20. The completed circuit from electrode A through the conducting liquid to electrode B is maintained so long as the potential is applied across the interface 18 by the battery 17 and electrodes A and C. Upon opening of the switch S, however, the applied potential is removed and the interaction at the interface 18 between the electrolytic solution and conducting liquid takes place to again shift the column in the right hand tube arm 12 back to the position shown in Figure 1 thereby opening the circuit between electrodes A and B.

Figures 3, 4, 5, 6 and 7 show various modified forms of the apparatus of this invention. In each of these figures, the elements common to those shown in Figure 1 are designated by the same reference numerals and lettering. Refering to Figure 3 for example, the arrangement is similar to the embodiment of Figures 1 and 2 except that the container is of a modified U shape having arms 21 and 22 closed at their upper ends whereby the tube is sealed. Further, the connecting portion of the U-arms comprises a small diameter capillary tube 23. When a potential is applied across the interface 18 by means of connecting a source of potential between the electrodes A and C, the surface tension of the conducting liquid 13 is altered whereby the space 19 between the electrode B and the conducting liquid 13 is closed. Removal of the applied potential between the electrodes A and C alters the surface tension again to cause the conducting liquid in the capillary tube 23 to move back to the position shown in Figure 3 whereby the circuit between the electrodes A and B is opened.

Figure 3:
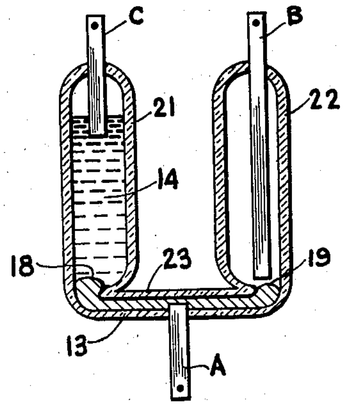
Figure 3 illustrates a modified embodiment of the apparatus illustrated in Figures 1 and 2.

In the embodiment shown in Figure 3, the provision of the capillary tube results in an extremely sensitive relay. This sensitivity is achieved by the fact that a small change in the surface tension results in a relatively large longitudinal movement of the mercury through the capillary portion in view of its small diameter, insuring positive operation for a given gap 19.

Figure 4:
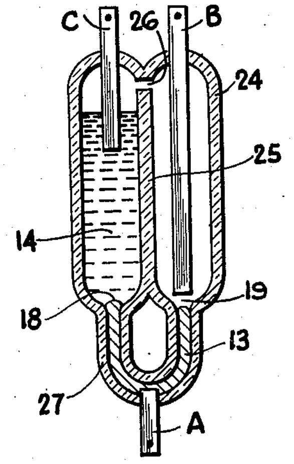
Figure 4 shows a further embodiment of the apparatus.

In the embodiment of Figure 4, the container constitutes a single integral structure 24 with a common wall 25 dividing the container into two chambers. A vent means in the form of an orifice 26 enables the pressure in the two portions of the container above the level of the electrolytic solution 14 and the level of the conducting liquid 13 to be equalized. As a result, the device is relatively independent of temperature changes. In the embodiment of Figure 4, a capillary tube portion 27 in the shape of a U is provided.

Figure 5:
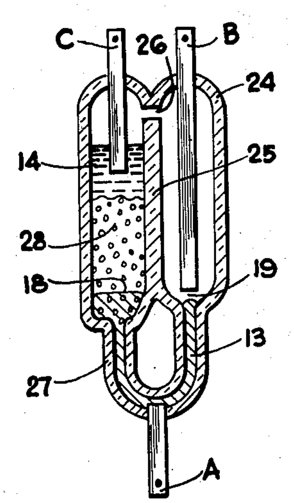
Figure 5 illustrates a means for adjusting the response time of the relay of Figure 4.

The embodiment shown in Figure 5 is similar to that in Figure 4 except that there is included a glass sponge 28 above the interface 18 between the electrolytic solution 14 and conducting liquid 13. This glass sponge delays the changes that take place in the surface tension as a result of the action of the electrolytic solution and the subsequent neutralization caused by the applied potential, whereby a time delay between the time the potential is applied across the interface and the time that the gap 19 is closed to connect the electrodes A and B, takes place. The length of time delay or response of the system, may be varied depending, among other things, upon the physical characteristics of the glass sponge 28.

Figure 6:
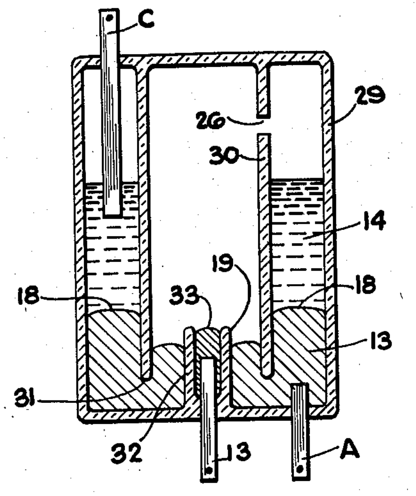
Figure 6 shows yet another embodiment of the invention.

In the embodiment of Figure 6, a still differently shaped container means is provided. As shown, the structure is in the form of a cylindrical container 29 and concentrically positioned cylindrical tube 30. The container 29 and tube 30 are closed off at their upper ends as shown, the lower end of the tube 30 terminating short of the bottom end of the container as indicated by the gap 31. The bottom end of the container 29 is provided with a closure as shown. In the device of Figure 6, the conducting liquid 13 is disposed, together with the electrolytic solution 14, in the annular space defined by the outer wall of the tube 30 and the inner wall of the container 29. A second portion of the conducting liquid is positioned within the lower open end of the tube 30. The second electrode B passes concentrically up through the bottom closure of the container 29 and is surrounded by a protective sleeve 32 whereby it is held out of contact with the conducting liquid 13 when a portion of this conducting liquid is in a first given position or level.

In operation, application of a potential between the electrodes A and C as described previously, will alter the surface tension of the interface 18 causing the level of the conducting liquid to rise within the open end of the tube 30 to close the gap 19 and contact the electrode B through a small globule of mercury 33. The advantage in the physical arrangement of the container in Figure 6 resides in the fact that a relatively large surface area of the conducting liquid is provided for reaction with the electrolytic solution 14. Further, the provision of the protecting sleeve 32 within the lower end of the inner concentric tube 30 enables the device to be operative even though it may be tipped to a considerable angle.

Figure 7:
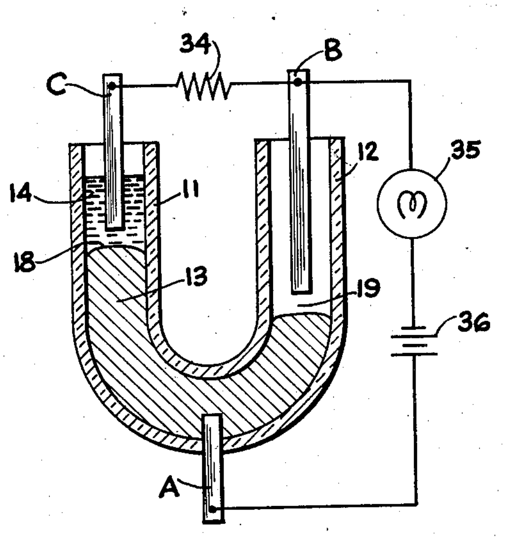
Figure 7 illustrates one application of this invention in an electrical circuit.

In Figure 7 there is illustrated one practical use for the method and apparatus of this invention. Referring to Figure 7 there is shown a voltage dropping resistance 34 connected between the electrode B and third electrode C. Also connected to the electrode B is a lamp 35 connected to one terminal of a potential source 36, the other terminal of which connects to the electrode A.

In operation, assume that the conducting liquid 13 is in the position illustrated in Figure 7 out of contact with the electrode B. Under these circumstances a potential will exist between the electrodes A and C as a result of an extremely small current flow through lamp 35 and resistance 34 across the interface 18. This small trickle of current across the interface alters the surface tension characteristics of the conducting liquid 13, as described previously, causing the portion of liquid in the U-arm 12 to rise closing the gap 19 and making contact with the electrode B. When contact with the electrode B is made, the lamp 35 will light since the circuit across the lamp is closed by the electrodes A and B and the conducting liquid. Lighting of the lamp 35 shunts the small current passing through the resistance 34 so that the potential applied across the interface 18 becomes negligible. Absence of this small potential across the interface 18 then enables the interplay between the electrolytic solution 14 and conductive liquid 13 to alter the surface tension thereby lowering the level in the U-arm 12 of the U-tube resulting in the gap 19 and opening the circuit across the lamp 35. Opening of this circuit then places the potential of the battery 35 across the voltage dropping resistance 34, electrode C and electrode A whence again the surface tension is altered so that the conducting liquid makes contact with the electrode B to again light the lamp 35. By this arrangement the lamp 34 will alternately turn on and off at a rate determined by the response time of the system and there is provided a simple and economic flasher circuit.

In all of the embodiments described, the response time of the system depends, among other factors, upon the physical dimensioning of the container means. For example, where small capillary tubes are employed such as tube 23 in Figure 3 and tube 27 in Figures 4 and 5, a relatively small change in the surface tension results in a relatively large longitudinal movement of the mercury column so that the response time is relatively quick. On the other hand, if a glass sponge material such as the sponge 28 in Figure 5 is employed, the response time can be delayed considerably.

From the above description it will be seen that the present invention provides novel apparatuses whereby an electrical circuit may be opened or closed in response to an extremely small signal. It has been found that the potential necessary to neutralize the electrical action taking place at the interface is extremely small and that the necessary neutralizing signal power may be in the order of microwatts. On the other hand, the electrical conductive circuit established by the conducting liquid such as the mercury 13 between the electrodes A and B may easily carry several amperes.

Further modifications within the scope and spirit of the present invention will readily occur to those skilled in the art. The apparatus is, therefore, not to be thought of as limited to the specific examples chosen for illustrative purposes.

What is claimed is:

1. A relay device comprising a pair of electrodes mounted in spaced relationship; a conductor which is liquid at the relay-operating condition, containing means for supporting said conductor in continuous electrical contact with one of said electrodes; an electrolyte which is fluid at said operating condition, said electrolyte being immiscible with said conducting liquid; means for supporting the electrolyte in contact with one portion of the conductor along an interface in which an electric charge is developed, thereby altering the surface tension of the conductor at the interface so that another portion of the conductor assumes a first of two positions; and means for applying across said interface an electrical potential of such polarity and magnitude as to neutralize said charge and thus cause said other portion of the conductor to assume the second of its two positions, said other of the pair of electrodes being positioned to make electrical contact with the conductor when the conductor is in one of its two positions and to be separated from the conductor when the conductor is in the other of its two positions.

2. A device according to claim 1, in which said containing means comprises a U tube, said first portion of the liquid conductor being in one arm of the U tube and said second portion of the conductor being in the other arm of said U tube.

3. A device according to claim 2, in which the portion of said U tube connecting said arms comprises a capillary passage; and means sealing closed the upper ends of said U tube arms.

4. A device according to claim 3, including a vent means connecting the two arms of said U tube so that pressure above the electrolyte in contact with the liquid conductor in one arm is equalized with the pressure above the portion of the liquid conductor in said other arm.

5. A device according to claim 4, including a glass sponge positioned at said interface whereby the alteration in said surface tension is delayed.

6. A device according to claim 1, including means for delaying the movement of said electrolyte and said conductor.

7. A device according to claim 1, in which said containing means comprises a cylindrical container including a concentric cylindrical tube, said container and tube being both closed at one end, the other end of said tube terminating short of the other end of said container; means closing said other end of said container; said first portion of the liquid conductor being disposed about the annular space defined by the exterior wall of said tube and interior wall of said container; and said second portion of the conductor being positioned within said tube.

8. A device according to claim 7, in which said first electrode passes concentrically through said other end of said container; and a protecting sleeve surrounding said electrode and passing upwardly within the open end of said tube whereby said electrode is out of electrical contact with said second portion of said conductor when said potential is not applied.

9. A device according to claim 1, in which said means for applying an electrical potential includes a third electrode in electrical contact with said electrolyte; a source of potential connected between said first and second electrodes; and a voltage dropping resistance connected between said third and second electrodes, said device also including a lamp in series with said source of potential whereby said lamp will flash on and off as said second portion of the conductor makes and breaks electrical contact with said second electrode.

References Cited in the file of this patent

UNITED STATES PATENTS

| | | |
|---|---|---|
| 342,549 | Ward et al. | May 25, 1886 |
| 798,481 | Armstrong et al. | Aug. 29, 1905 |